even, 3,629,394
Patented Dec. 21, 1971

3,629,394
PLEASANT TASTING CHEWABLE TABLETS AND THEIR PRODUCTION
William E. Gaunt and Marjorie Claire Gaunt, Hackensack, N.J. (both of P.O. Box 744, Stroudsburg, Pa. 18360)
No Drawing. Filed Oct. 13, 1969, Ser. No. 866,018
Int. Cl. A61k 15/00
U.S. Cl. 424—38                                            5 Claims

ABSTRACT OF THE DISCLOSURE

Water-soluble bad-tasting drugs and vitamins are put into chewable tablet form wherein the drugs and vitamins have a pleasant taste and are readily available upon ingestion. A water solution or water-alcohol solution of the bad-tasting substance is absorbed into rice endosperm using about enough solution for complete hydration or slightly less, followed by drying. Precooked rice endosperm can also be used. The drugs include phenothiazine tranquilizers and barbiturates and the vitamins include thiamin, niacinamide and pyridoxine. The water-soluble substance may constitute up to 60% of the finished product, with the rice endosperms, which may be previously comminuted, making up the balance. The pleasant tasting chewable tablets contain the bad tasting substance with the bad taste masked, conventional chewable tablet base constituents for the tableting of the rice endosperm-drug particles being combined with the treated rice endosperms.

---

This invention relates to a novel method of masking the taste of bad-tasting drugs without impairing the availability of the drug to the body after its ingestion. The invention provides for the bad-tasting drugs to be formed into pleasant tasting chewable tablets giving no offense to the taste buds of the oral cavity.

Pleasant tasting chewable multivitamin tablets using wax-composition coated thiamine, riboflavin, niacinamide and pyridoxine have been available for some time, but the procedures used in masking the moderately unpleasant taste of these vitamins have not proven to be adequate for masking the extremely unpleasant flavor of such drugs as, for example, the anti-histamines, the phenothiazine tranquilizers, the barbiturates and others.

The present invention, in addition to accommodating the vitamins with ease, provides for the masking of the taste of the above mentioned drugs and also eliminates the local anaesthetic effect possessed by many of them. In this connection it is interesting to note that a commercially available pyrilamine-resin complex has no taste, but the local anaesthetic action of pyralamine on the tongue is most decidedly unpleasant.

A recent French Pat. No. 1,462,193 describes the use of ethyl cellulose in high proportion for preparing tasteless powders of bad-tasting drugs. Undoubtedly such compositions would be relatively tasteless but by the same token, relatively ineffective because of the resistance ethyl cellulose exhibits to water and to alimentary fluids.

The making of pleasant tasting and effective chewable tablets from bad tasting drugs presents some interesting problems. To be pleasant tasting the masking of the drug must be virtually one hundred percent complete. Many drugs are so nauseatingly revolting that even when the vastly greater part of the drug used in the dose is masked the remaining small proportion not adequately covered provides such an assault to the taste buds that the product is deemed to be practically as unacceptable as the one made with no camouflaging at all. On the other hand, for the dosage form to provide the pharmacological effect intended the method used to achieve virtually one hundred percent masking must not be such that the drug so masked is virtually one hundred percent unavailable to the body.

The present invention provides a means of achieving virtually a total masking for the period of time that the drug resides in the mouth in chewable tablet form, but permits the release of all of the drug within a short period of time after swallowing.

Further prerequisites for a satisfactory chewable tablet of a bad-tasting drug are that the particles of masked drug are sufficiently small so that they are not noticeable in the mouth, soft so that no grittiness is apparent in the mouth, capable of withstanding mastication without release of the drug to the saliva in the mouth and of such character that they can be incorporated with the customary basic chewable tablet granulations composed of sugar, mannitol or glycine or combinations thereof and compressed into firm tablets without rupture of the masked particles.

The present invention fulfills these requirements.

The invention is based upon the observation that the endosperm of a grain of rice can be made to accept and to hold within its structure very high proportions of water-soluble substance in a volume of water equal to or slightly less than that required for the full hydration of the quantity of rice endosperms to be used, adding the rice endosperms to this solution, raising the temperature to the boiling point and maintaining it there until all the liquid has entered into the structure of the rice endosperms. The endosperms are then dried, the water evaporating from them without migration of the dissolved substance to the surface. When dried the endosperms have their original shape but now have, fixed within their structure the water-soluble substance. It has been found possible to introduce such a quantity of water-soluble substance into the rice endosperm that the final dried product may consist of about sixty percent water-soluble substance and about forty percent rice endosperms.

The unexpected observation has further been made that by using precooked rice, the so-called "minute" rice made by General Foods or the equivalent made by others, the process of hydration of the rice endosperm with a water solution of a water-soluble substance can be accomplished without the application of heat, a great advantage if the water-soluble substance used is heat-sensitive. The rate of hydration of such precooked rice at room temperature is quite rapid and complete and if the proper proportion of water is used the hydrated precooked rice endosperms remain discrete entities which may be readily dried retaining within their structure the water-soluble substance, there being no migration of the water-soluble substance to the surface of the precooked rice endosperm.

Whether the regular rice endosperm or the precooked rice endosperm is used they both on fracture exhibit the same appearance under moderate magnification: the fractured surface appears glass-like and homogeneous with no evidence of crystallization of the water-soluble substance within the structure of the rice endosperm when the water-soluble substance with which the rice endosperm is loaded is a crystalline chemical entity. The rice endosperm loaded with the water-soluble substance can be easily reduced to smaller particles by suitable milling equipment to give firm, hard particles which under modeerate magnification appear to be of homogeneous glass-like structure.

It has also been observed that the loading of the endosperm of precooked rice with a water-soluble substance is appreciably hastened when the temperature of the water solution is raised above room temperature. Furthermore, the rate of hydration can be hastened by milling the precooked rice into smaller particles before exposing them to the water solution of the water-soluble substance. In addition, it has been found that aqueous-alcoholic solutions containing up to forty percent (volume by volume) of methanol, ethanol or isopropanol can be used to hydrate the rice endosperm, a factor which is of advantage when the solubility of the water-soluble substance in water is limited and is greater in a water-alcohol mixture.

Particles of rice endosperm loaded with a water-soluble solid substance by the procedures described above are quite hard and resilient and cannot readily be compressed in admixture with a basic chewable tablet granulation into acceptable non-gritty tablets.

It has, however, been found that the rice endosperm will admit into its structure aqueous solutions of glycerin, propylene glycol, or the lower polyethylene glycols, and on removal of the water by evaporation the glycerin, propylene glycol or lower polyethylene glycol is retained within the structure of the endosperm and imparts to it a degree of softness and flexibility which increases as the proportion of glycerin, propylene glycol or lower polyethylene glycol, increases. It appears that the glycerin, propylene glycol or lower polyethylene glycol fixed in the rice endosperm are in some manner plasticizing the substance of the rice endosperm rendering it more pliable. Preparations have been made composed of fifty percent rice endosperm as non-sticky solid structures and fifty percent glycerol. It has, however, been found that glycerin or propylene glycol at the fifteen to twenty percent level introduce sufficient softness and flexibility to small particles of rice endosperm so that they can be compressed in admixture with a basic chewable tablet granulation into acceptable non-gritty chewable tablets.

Hydration of the precooked rice endosperms or of small particles of the precooked rice endosperms with an aqueous solution of a water-soluble substance to which is also added an appropriate quantity of glycerin, propylene glycol or lower polyethylene glycol and subsequent removal of the water by evaporation, gives rice endosperms or small particles of rice endosperms containing the water-soluble material within their substance and having a desirable degree of softness and pliability with no tendency to rupture on compression. When the water-soluble material loaded into the plasticized rice endosperm subsequently made into small particles, or into small particles of plasticized rice endosperms is one of bad taste, the chewable tablets made therefrom by their admixture with a basic chewable granulation followed by compression into tablets in the conventional manner, the tablets are almost acceptable to the average consumer. However, if the plasticized rice endosperm particles loaded with the evil tasting water-soluble substance are coated with a low melting water-insoluble substance, such as beewax, carnauba wax and other similar waxes, microcrystalline paraffin wax, stearin, hydrogenated vegetable oils, glyceryl monostearate, acetylated monoglycerides or the like, the chewable tablets made therefrom have no residual evil taste on mastication and ingestion, nor do they have any residual local anaesthetic effect on the buccal cavity when such local anaesthetic property is also possessed by the water-soluble substance which possesses the property of evil taste.

Not unpleasant tasting chewable tablets may be made of wide variety of pharmacodynamically active water-soluble substances such as the water-soluble antihistamines, antitussives, antibiotics, analgesics, anorexics, anticholinergics, antispasmodics, decongestants, antimotion sickness drugs, as well as the barbiturates, tranquilizers, choline esterase inhibitors and any other water-soluble pharmacodynamically active substance without, however, considering this listing to be limiting.

The following examples are cited to illustrate the principles of operation of the invention. It is to be understood that the principles described can be applied with equal effectiveness to the production of a legion of pleasant tasting chewable tablets of evil tasting biologically active water-soluble substances not specifically mentioned in the examples.

EXAMPLE 1

Ten grams of chlorpheniramine maleate are dissolved in 120 ml. of water to which is then added 20 grams of glycerin and 60 grams of rice endosperms. The mixture is heated with gentle stirring to the boiling point, loosely covered, the heating being continued until all of the aqueous solution has entered into the structure of the rice endosperms (approximately 15 minutes). The loaded endosperms are removed from the cooking container, spread on trays and dried at 60 to 65° C. The dried endosperms are ground in a suitable mill and screened through a 30 mesh sieve.

The dry 30 mesh granules are placed in a jacketed vessel and warmed by hot water to about 60° C. Ten grams of molten acetylated monoglyceride are added with stirring. Stirring is continued as the mixture is allowed to cool, the particles of loaded rice endosperm remaining discrete each acquiring a thin film of acetylated monoglycerides on its surface. The resulting product is again screened to remove any adventitious lumps. It contains 10 percent of chlorpheniramine maleate on the dry basis.

Twenty grams of the chlorpheniramine maleate preparation are blended with 400 grams of a conventional basic granulation for chewable tablets, suitably flavored and sweetened, and compressed on conventional tablet making equipment, into pleasant tasting chewable tablets of 420 mg. weight and containing in each tablet 2 mg. of chlorpheniramine maleate.

EXAMPLE 2

Twenty grams of phenylephrine hydrochloride are dissolved in 100 ml. of water to which 20 grams of propylene glycol are added. The solution is stirred and to it are added 50 grams of precooked rice endosperms ("minute rice"). The mixture is stirred at intervals at room temperature as the solution hydrates the precooked rice endosperm. When all of the aqueous solution has been absorbed the endosperms are spread on a drying tray at 65° C. The dry endosperms are ground in a suitable mill and screened to 30 mesh.

The dry 30 mesh granules are placed in a jacketed vessel and heated to 65° C. with stirring. Ten grams of molten hydrogenated vegetable oils are added with stirring continuing as the mixture cools. The resultant product is screened to remove adventitious agglomerates and contains 20 percent of phenylephrine hydrochloride.

Fifty grams of the phenylephrine hydrochloride granulation are blended with 400 grams of a conventional basic granulation for chewable tablets, suitably flavored and sweetened, and compressed on conventional tablet equipment into pleasant tasting chewable tablets of 450 mg. weight and containing in each tablet 10 mg. of phenylephrine hydrochloride.

EXAMPLE 3

Fifteen grams of dextromethorphan hydrobromide are dissolved in 90 ml. of water containing 20 grams of glycerin. To this solution is added 45 grams of precooked rice endosperm previously ground in a suitable mill and screened through a 30 mesh sieve. The mixture is stirred as the small particles of precooked rice endosperm rapidly absorb the aqueous solution. When all of the solution has been absorbed the hydrated small particles of rice endosperm are spread on trays and dried at 65° C. The dried product is again screened and then placed in a jacketed vessel and heated with stirring to 90° C. Twenty grams of molten castor wax are added with stirring which is continued as the mixture cools. The castor wax coated, dextromethorphan hydrobromide containing small particles of rice endosperm are then screened.

Fifty grams of the above product are blended with 400 grams of conventional basic granulation for chewable tablets, suitably flavored and sweetened, and compressed on conventional tablet equipment into pleasant tasting chewable tablets of 450 mg. weight and containing in each tablet 7.5 mg. of dextromethorphan hydrobromide.

EXAMPLE 4

Twenty grams of the chlorpheniramine maleate product as made in Example one, 50 grams of the phenylephrine hydrochloride product as made in Example two, and 50 grams of the dextromethorphan hydrobromide product as made in Example three, are blended together with 400 grams of a conventional basic granulation for chewable tablets suitably flavored and sweetened, and compressed on conventional tablet making equipment into pleasant tasting chewable tablets of 520 mg. weight and containing in each tablet 2 mg. of the antihistamine chlorphenitramine maleate, 10 mg. of the decongestant phenylephrine hydrochloride and 7.5 mg. of the antitussive dextromethorphan hydrobromide.

EXAMPLE 5

Two grams of chlorpheniramine maleate, 10 grams of phenylephrine hydrochloride and 7.5 grams of dextromethorphan hydrobromide are dissolved in 100 ml. of water containing 20.5 grams of glycerin. To this solution are added 50 grams of precooked rice endosperm previously ground in a suitable mill and screened to 30 mesh. The mixture is stirred as the particles of rice endosperm absorb the aqueous phase. When absorption is complete the product is dried at 65° C. as described in previous examples. The dried product is screened through a 24 mesh sieve and placed in a jacketed vessel.

The product is heated with stirring to 50° C. and to it are added with stirring 10 grams of molten acetylated monoglycerides. The mixture is stirred as it cools and is screened after it has cooled to remove any adventitiously formed aggregates. Fifty grams of this product are blended with 200 grams of a conventional basic granulation for chewable tablets, suitably flavored and sweetened, and compressed on conventional tablet making equipment into pleasant tasting chewable tablets of 500 mg. weight each containing 2 mg. of the antihistamine chlorpheniramine maleate, 10 mg. of the decongestant phenylephrine hydrochloride and 7.5 mg. of the antitussive dextromethorphan hydrobromide.

EXAMPLE 6

Twenty-five grams of glyceryl guaiacolate are dissolved in a mixture of 60 ml. of water and 20 ml. of methyl alcohol containing 14 grams of glycerin. To this solution are added 40 grams of precooked rice endosperm previously ground in a suitable mill into particles passing through a 30 mesh sieve. The mixture is stirred as the aqueous alcoholic solution of the glyceryl guaiacolate enters into the structure of the precooked rice endosperm particles. When all the liquid has been absorbed the wet discrete particles are spread on trays and dried.

The dried particles are screened and then coated with 10 grams of molten acetylated monoglycerides as described in prior examples. To the acetylated monoglyceride coated glyceryl guaiacolate containing precooked rice endosperm particles is added one gram of fumed silica (Cabosil) to improve the flow characteristics of the product.

The product is converted into chewable tablets as described in the previous examples.

EXAMPLE 7

Twenty-five grams of sodium butabarbital are dissolved in 100 ml. of water containing 20 grams of polyethylene glycol 600. To this solution are added 55 grams of precooked rice endosperms previously ground to pass through a 30 mesh screen. The mixture is stirred until all of the liquid phase has been absorbed by the particles of precooked rice endosperm. When this has occurred the product is spread on trays and dried in an oven at 60 to 65° C. The dried product is screened, coated with 20 grams of acetylated monoglycerides as previously described and transformed into pleasant tasting chewable tablets as above.

This example, in addition to demonstrating the making of pleasant tasting chewable tablets of a member of a class of particularly nauseatingly tasting therapeutic materials, illustrates the fact that the endosperm of rice retains its basic composure even when it is exposed to and absorbs an aqueous solution at the alkalinity of about pH 10.

EXAMPLE 8

Forty grams of betaine hydrochloride are dissolved in 120 ml. of water and to this solution is added 60 grams of precooked rice endosperms previously ground to pass through a 30 mesh screen. The mixture is stirred gently until all of the liquid phase has been absorbed by the particles of precooked rice endosperm. When this has occurred, the product is spread on trays and dried at 60–65° C. The dried product is screened and the screened, non-hygroscopic, tough particles contain 40 percent by weight of the betaine hydrochloride.

This example illustrates that the endosperm of rice retains its basic composure even when it is exposed to and absorbs an aqueous solution at about pH 1 and is then dried.

EXAMPLE 9

1620 grams of sodium phenobarbital and 80 grams of sodium cyclamate are dissolved in 10 litres of water to which is then added 1500 grams of glycerin. To this solution is added 5300 grams of precooked rice endosperm previously reduced to a particle size of 30 mesh. The mixture is stirred until all the liquid has been absorbed into the rice endosperm. The wet granules are dried at 125°–135° F. and screened to break up any lumps.

10.37 grams of hyoscyamine sulfate, 1.94 grams of atropine sulfate and 0.65 grams of hyoscine hydrobromide are dissolved in 650 cc. of water to which is then added 75 grams of glycerin. To this solution is added 337 grams of precooked rice endosperm which has previously been reduced to a particle size of 30 mesh. The mixture is stirred until all the liquid has been absorbed into the rice endosperm. The wet granules are dried and then screened to break up any lumps.

The above two preparations are placed in a heated coating pan which is set into rotation to provide a uniform mix. The pan is heated to 60° C. and 1375 grams of molten acetylated monoglycerides are sprayed onto the surface of the particles moving in the rotating pan. When all of the acetylated monoglycerides have been applied to the surface of the particles, 200 grams of fumed silica are added with continued rotation. Heating of the pan is stopped and it is permitted to cool down while still rotating.

When the particles in the pan are cool they are screened to remove any adventitious agglomerates.

The acetylated monoglyceride coated medicament containing particles of rice endosperm are mixed with 50 kilograms of a conventional chewable tablet granulation and compressed into tablet of 605 mg. weight and containing in each tablet 16.2 mg. of sodium phenobarbital, 0.1037 mg. of hyoscyamine sulfate, 0.0194 mg. of atropine sulfate and 0.0065 mg. of hyoscine hydrobromide.

EXAMPLE 10

35 grams of thiamine mononitrate and 5 grams of polyethylene glycol 1000 are added to 120 ml. of water and heated to 100° C. until all the thiamine mononitrate has dissolved. To this hot solution are added 55 grams of precooked rice endosperms, the mixture being maintained at about 100° C. until all the aqueous phase has been absorbed by the rice endosperms which are then spread on a flat tray and dried at about 65° C. The dry endosperms are milled to 40 mesh and then coated, as described in earlier examples, with 10 grams of acetylated monoglycerides. The final product is screened through a 30 mesh sieve and may then be used in the manufacture of multivitamin chewable tablets, 3 mg. of the product providing slightly more than 1 mg. of thiamine mononitrate activity.

EXAMPLE 11

40 grams of niacinamide and 10 grams of propylene glycol are dissolved in 80 ml. of water to which solution is then added 40 grams of precooked rice endosperm previously milled to 50 mesh. The mixture is stirred until all of the aqueous solution has been absorbed by the rice endosperm particles which are then dried and screened through a 40 mesh sieve. The niacinamide-loaded rice endosperm particles are coated with 10 grams of acetylated monoglycerides as described above and may then be used in the manufacture of multivitamin chewable tablets, each 2.5 mg. supplying 1 mg. of niacinamide activity.

What is claimed is:

1. A chewable tablet dosage unit form comprising an effective dosage amount of an otherwise bad tasting water-soluble or water-alcohol-soluble therapeutic substance absorbed and fixed within otherwise gritty, hard and resilient pre-cooked milled rapidly hydrating rice endosperm particles tending to rupture on compression, said gritty rice particles being combined with an effective amount of plasticizing softener selected from the group consisting of glycerine, propylene glycol and a lower polyethylene glycol sufficient to impart sufficient plasticizing softness, pliability and flexibility thereto as to be acceptably compressed without rupturing or grittiness, said plasticized rice particles loaded with bad tasting active substance being further coated with an effective amount of a low melting water-insoluble substance selected from the group consisting of beeswax, carnauba wax, microcrystalline paraffin wax, stearin, hydrogenated vegetable oil, glyceryl monostearate and acetylated monoglycerides sufficient to mask residual bad taste upon mastication, said coated plasticized rice particles being combined with a conventional chewable tablet granulation and formed into orally administrable not unpleasant tasting chewable tablets.

2. The tablets of claim 1 wherein the plasticizing softener amounts to 0–25% of the weight of the rice endosperm-therapeutic substance particles.

3. The tablets of claim 1 wherein the low melting water-insoluble coating material amounts to 0–20% of the weight of the rice endosperm-therapeutic substance particles.

4. The tablets of claim 1 wherein the at least one bad tasting therapeutic substance amounts to 0.1–60% of the weight of the rice endosperm-therapeutic substance particles.

5. The tablets of claim 1 wherein the rice endosperm amounts to 99.9–40% of the weight of the rice endosperm-therapeutic substance particles.

References Cited

UNITED STATES PATENTS

| | | | |
|---|---|---|---|
| 2,472,426 | 6/1949 | Huzenlaub | 99—11 |
| 2,828,209 | 3/1958 | Hollis et al. | 99—80 |
| 2,887,437 | 5/1959 | Klioze et al. | 424—280 |
| 2,902,407 | 9/1959 | Gross et al. | 424—38 |
| 3,035,985 | 5/1962 | Stoyle et al. | 424—38 |
| 3,037,911 | 6/1962 | Stoyle et al. | 424—38 |
| 3,080,292 | 3/1963 | Koff | 424—38 |
| 3,080,293 | 3/1963 | Koff | 424—266 X |
| 3,247,065 | 4/1966 | Koff | 424—38 X |
| 3,266,992 | 8/1966 | De Jong | 424—280 X |
| 3,497,589 | 2/1970 | Borenstbin et al. | 424—38 X |

OTHER REFERENCES

Chem. Abstracts 39, p. 4704(6), 1945.
Chem. Abstracts 43, p. 8071e, 1949.
Chem. Abstracts 52, pp. 2300c, 5698c, 13139c, 1958.

SHEP K. ROSE, Primary Examiner

U.S. Cl. X.R.

99—11, 83; 424—361